United States Patent
Xu et al.

(10) Patent No.: US 10,264,914 B2
(45) Date of Patent: Apr. 23, 2019

(54) AUTOMATIC INGREDIENT FEEDING APPARATUS APPLICABLE IN A FULLY AUTOMATED COOKING MACHINE

(71) Applicants: Jinbiao Xu, Guangzhou (CN); Guang He, Shenzhen (CN)

(72) Inventors: Jinbiao Xu, Guangzhou (CN); Guang He, Shenzhen (CN)

(*) Notice: Subject to any disclaimer, the term of this patent is extended or adjusted under 35 U.S.C. 154(b) by 702 days.

(21) Appl. No.: 14/429,365

(22) PCT Filed: Mar. 7, 2013

(86) PCT No.: PCT/CN2013/072296
§ 371 (c)(1),
(2) Date: Mar. 19, 2015

(87) PCT Pub. No.: WO2014/131206
PCT Pub. Date: Sep. 4, 2014

(65) Prior Publication Data
US 2015/0238046 A1  Aug. 27, 2015

(30) Foreign Application Priority Data

Feb. 28, 2013  (CN) .......................... 2013 1 0064067

(51) Int. Cl.
*A47J 36/00* (2006.01)
*G06F 9/30* (2018.01)
*A47J 37/12* (2006.01)

(52) U.S. Cl.
CPC .......... *A47J 36/00* (2013.01); *A47J 37/1228* (2013.01); *A47J 37/1271* (2013.01); *G06F 9/30* (2013.01)

(58) Field of Classification Search
USPC .......................................................... 99/334
See application file for complete search history.

(56) References Cited

U.S. PATENT DOCUMENTS

| | | | | |
|---|---|---|---|---|
| 3,659,068 A | * | 4/1972 | Duffner ................ | H05B 6/6417 219/413 |
| 3,895,849 A | * | 7/1975 | Zehr ....................... | A62C 2/12 16/51 |
| 4,610,886 A | * | 9/1986 | Buller-Colthurst .... | A21C 13/02 198/575 |

(Continued)

*Primary Examiner* — Ibrahime A Abraham
*Assistant Examiner* — Gyounghyun Bae

(57) ABSTRACT

An automatic ingredient feeding apparatus (1) comprises a machine frame (100), a feeder mechanism (11), a flipping mechanism (12) and a plurality of compartment door control mechanisms (13). The feeder mechanism comprises a shell (111), the shell is provided therein with a receiving space (114) for receiving a multi-compartment container (110) and is provided therein with a multi-compartment ingredient-dropping chamber (113) facing the receiving space. The flipping mechanism (12) is used for mounting the feeder mechanism (11) on the machine frame (110) and for controlling the feeder mechanism (11) to implement a 180-degree flip. Each of the plurality of compartment door control mechanisms (13) controls an opening/closing of a compartment door (115) of the individual compartment of the multi-compartment ingredient-dropping chamber (113). The flipping mechanism (12) and the plurality of compartment door control mechanisms (13) are all connected to a master control device (7).

10 Claims, 17 Drawing Sheets

(56) References Cited

U.S. PATENT DOCUMENTS

| | | | | | |
|---|---|---|---|---|---|
| 4,773,324 | A | * | 9/1988 | Wylie | A23N 15/003 99/638 |
| 5,228,382 | A | * | 7/1993 | Hayashi | A47J 27/18 99/328 |
| 5,353,847 | A | * | 10/1994 | Cahlander | B65B 1/32 141/1 |
| 5,586,486 | A | * | 12/1996 | Nitschke | A47J 37/1228 99/330 |
| 5,632,198 | A | * | 5/1997 | Yamada | A21C 9/00 99/334 |
| 6,557,597 | B2 | * | 5/2003 | Riesterer | A47J 31/40 141/351 |
| 7,172,335 | B1 | * | 2/2007 | O'Connor | A47J 43/044 366/142 |
| 7,861,705 | B2 | * | 1/2011 | Hulsey | A47J 37/07 126/25 A |
| 7,883,887 | B2 | * | 2/2011 | Takagi | A61L 2/07 312/236 |
| 7,930,973 | B2 | * | 4/2011 | Wong | A47J 37/108 366/144 |
| 8,523,050 | B1 | * | 9/2013 | Andreozzi | A47G 29/141 220/908.1 |
| 2004/0025707 | A1 | * | 2/2004 | Iori | A47J 27/18 99/404 |
| 2012/0199076 | A1 | * | 8/2012 | Biede | A01K 29/005 119/51.02 |

* cited by examiner

AUTOMATIC INGREDIENT FEEDING APPARATUS APPLICABLE IN A FULLY AUTOMATED COOKING MACHINE

FIELD OF THE INVENTION

The invention relates to an intelligent home appliance, more particularly, to an automatic ingredient feeding apparatus applicable in a fully automated cooking machine.

BACKGROUND OF THE INVENTION

Chinese cuisine has a tremendous range of flavors and styles. The basic cooking techniques include stir frying, stewing, deep frying, boiling, steaming, pan frying, roasting braise, and so on. The essence of cuisine is the mixture and heating of the ingredients, thus a variety of dishes can be made by changing the ingredients and heating intensity. However, up to now, cooking involves a lot of manual labor and relies very much on the cook's experiences and skills.

There exists some automated cooking machines, however, they normally cannot realize an automation process from feeding raw ingredients into the wok till pouring the cooked food out of the wok. More particularly, existing automated cooking machines cannot automatically put the raw ingredients (including raw main ingredients and accessory ingredients) into the wok. As a consequence, human intervention is still required during the cooking process, which means the automation degree of the existing cooking machines is yet to be improved.

SUMMARY OF THE INVENTION

The embodiments of the present application are aiming at providing an automatic ingredient feeding apparatus applicable in a fully automated cooking machine. The automatic ingredient feeding apparatus can put raw ingredients into a wok in a predetermined sequence at a predetermined time under the control of a master control device of the fully automated cooking machine, so as to realize a precise and automatic control of a cooking process.

In order to achieve the above object, the embodiments of the present invention provide an automatic ingredient feeding apparatus applicable in a fully automated cooking machine, which comprises:

a machine frame;

a feeder mechanism mounted on the machine frame for receiving a multi-compartment container containing raw ingredients, the feeder mechanism comprising a shell, the shell being provided therein with a receiving space for receiving the multi-compartment container and being provided with a multi-compartment ingredient-dropping chamber facing the receiving space, each individual compartment of the multi-compartment container communicating with and leaning against each individual compartment of the multi-compartment ingredient-dropping chamber when the multi-compartment container is received in the receiving space;

a flipping mechanism for mounting the feeder mechanism on the machine frame and for controlling the feeder mechanism to implement a 180-degree flip, the 180-degree flip of the feeder mechanism enabling the raw ingredients in the multi-compartment container to drop into the multi-compartment ingredient-dropping chamber; and a plurality of compartment door control mechanisms arranged in the shell, each of the plurality of compartment door control mechanisms controlling an opening/closing of a compartment door of the individual compartment of the multi-compartment ingredient-dropping chamber to allow the raw ingredients in the individual compartment of the multi-compartment ingredient-dropping chamber to drop into a wok right below the multi-compartment ingredient-dropping chamber when the compartment door is open;

wherein the flipping mechanism and the plurality of compartment door control mechanisms being all connected to a master control device of the cooking machine to receive a command issued by the master control device on a basis of a preset recipe program and react accordingly to the command.

Preferably, the flipping mechanism comprises a main shaft and a flipping motor, the shell of the feeder mechanism is fixedly connected to the main shaft and is mounted on the machine frame via the main shaft; the flipping motor is connected to the master control device and is controlled by the master control device to drive the main shaft to rotate, the rotation of the main shaft implements the 180-degree flip of the feeder mechanism.

Preferably, the flipping mechanism further comprises a position controlling detector for detecting a flipping angle of the feeder mechanism and transmitting detection data to the master control device.

Preferably, the compartment door of the individual compartment of the multi-compartment ingredient-dropping chamber consists of two door leaves that are opened or closed synchronously.

Preferably, each of the plurality of compartment door control mechanisms comprises two gears, an elastic component, a magnetic valve, and a rod, the two gears are engaged with each other and are fixedly connected to the two door leaves respectively, the two door leaves are connected via the elastic component and are in a closed state under an action of the elastic component, one end of the rod is connected to one of the gears, the other end of the rod is connected to an iron core of the magnetic valve; when the magnetic valve is switched on, the magnetic valve draws the iron core upwards to drive the rod to move upwards, thus allowing the two gears to rotate, so as to open the two door leaves by overcoming the pressure of the elastic component.

Preferably, the feeder mechanism provides in the shell with two side guiding plates and a baffle plate, the two side guiding plates and the baffle plate form the receiving space.

Preferably, the two side guiding plates are provided with ball plungers, two outer sides of the multi-compartment container are provided with locating recesses for matching the ball plungers, when a front wall of the multi-compartment container leans against the baffle plate, the ball plungers get stucked right in the locating recesses so as to secure the multi-compartment container in the receiving space.

Preferably, the multi-compartment container comprises four individual compartments, six individual compartments or eight individual compartments, and the multi-compartment ingredient-dropping chamber accordingly comprises four individual compartments, six individual compartments or eight individual compartments.

Preferably, the multi-compartment container is provided with an electronic tag, the shell of the feeder mechanism is provided with an electronic tag reader to read the electronic tag and transmit information read from the electronic tag to the master control device.

Preferably, the automatic ingredient feeding apparatus further comprises an ingredient-guiding chute extending from an end of the multi-compartment ingredient-dropping chamber which end is adjacent to the compartment door, the ingredient-guiding chute guides the raw ingredients in the individual compartment of the multi-compartment ingredient-dropping chamber to drop into the wok right below the multi-compartment ingredient-dropping chamber.

The automatic ingredient feeding apparatus applicable in a fully automated cooking machine provided by the embodiments of the present invention has the following advantages:

1. High level of precision. The automatic ingredient feeding apparatus puts the raw ingredients in a predetermined sequence at a predetermined time, which realizes the precise control of the cooking process.

2. High level of automation. No manual handling operation is involved in the cooking process, except that the raw ingredients should be placed into the receiving space of the cooking machine by an operator.

3. Diversification of feeding operation. The raw ingredients are stocked in the individual compartments (e.g., compartment A, compartment B, compartment C, compartment D, . . . ), one or more raw ingredients in a certain individual compartment is controlled to be put into the wok according to a predetermined sequence at a predetermined time. Therefore, a variety of dishes can be prepared by varying the raw ingredients, the sequence or the time for putting the raw ingredients.

4. High level of generality. The automatic ingredient feeding apparatus of the present application facilitates a standardization of the package of the raw ingredients. As a result, the process of production, storage, delivery and selling of the raw ingredients can all be standardized. The electronic tag (two-dimension codes, IC card, RFID, etc.) of the multi-compartment container provides an easy access to useful information, such as recommended recipe programs or details about the production, storage, delivery and selling of the raw ingredients.

BRIEF DESCRIPTION OF THE DRAWINGS

FIG. 12a is schematic diagram showing a connection relationship between the compartment door and the compartment door control mechanism illustrated in FIG. 10a; and FIG. 12b is a schematic diagram showing a connection relationship between the compartment door and the compartment door control mechanism illustrated in FIG. 11a.

DETAILED DESCRIPTION OF ILLUSTRATED EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
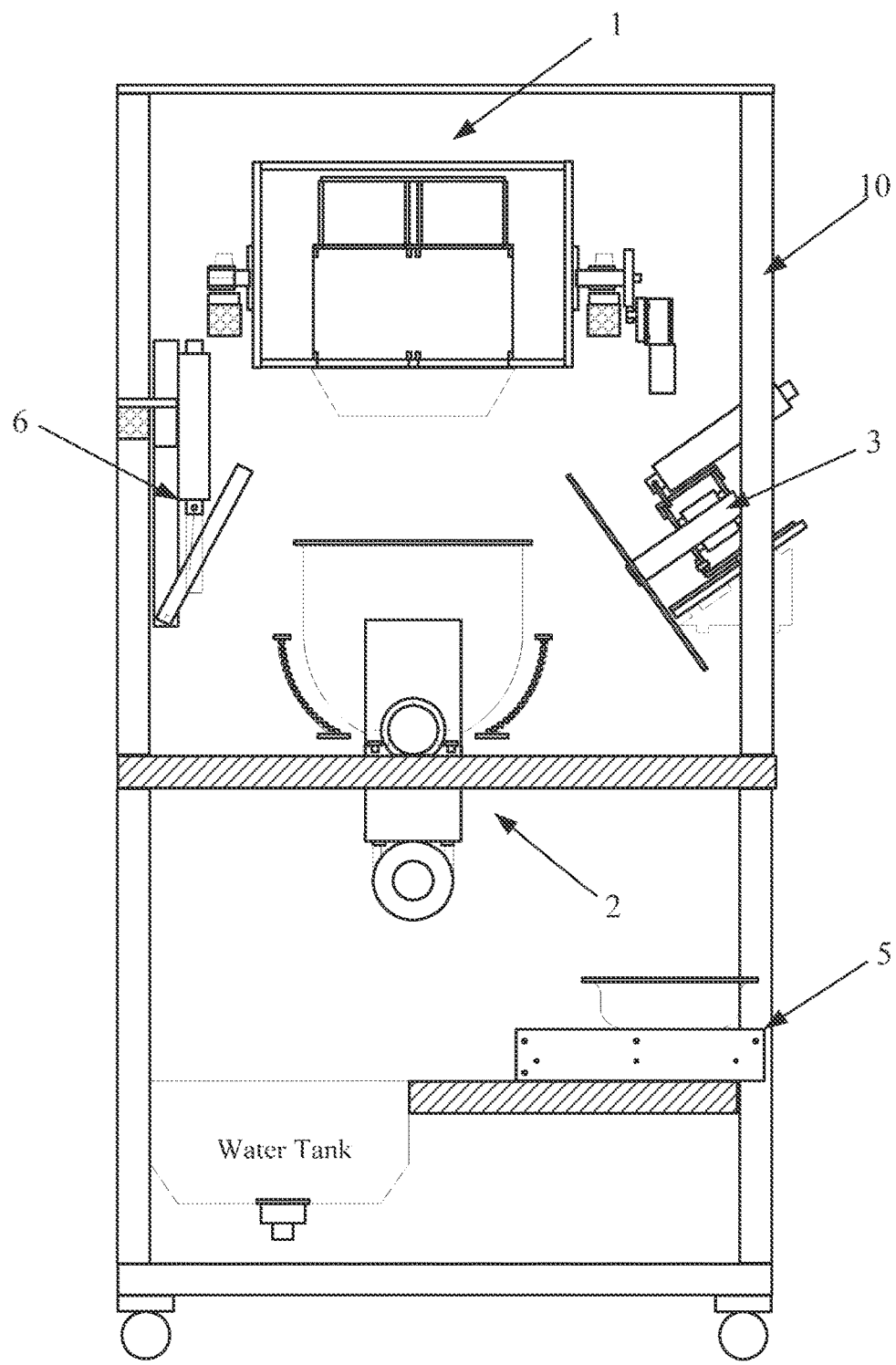
FIG. 1 is a schematic diagram showing the structure of a cooking machine with an automatic ingredient feeding apparatus according to an embodiment of the present invention.
Figure 2:
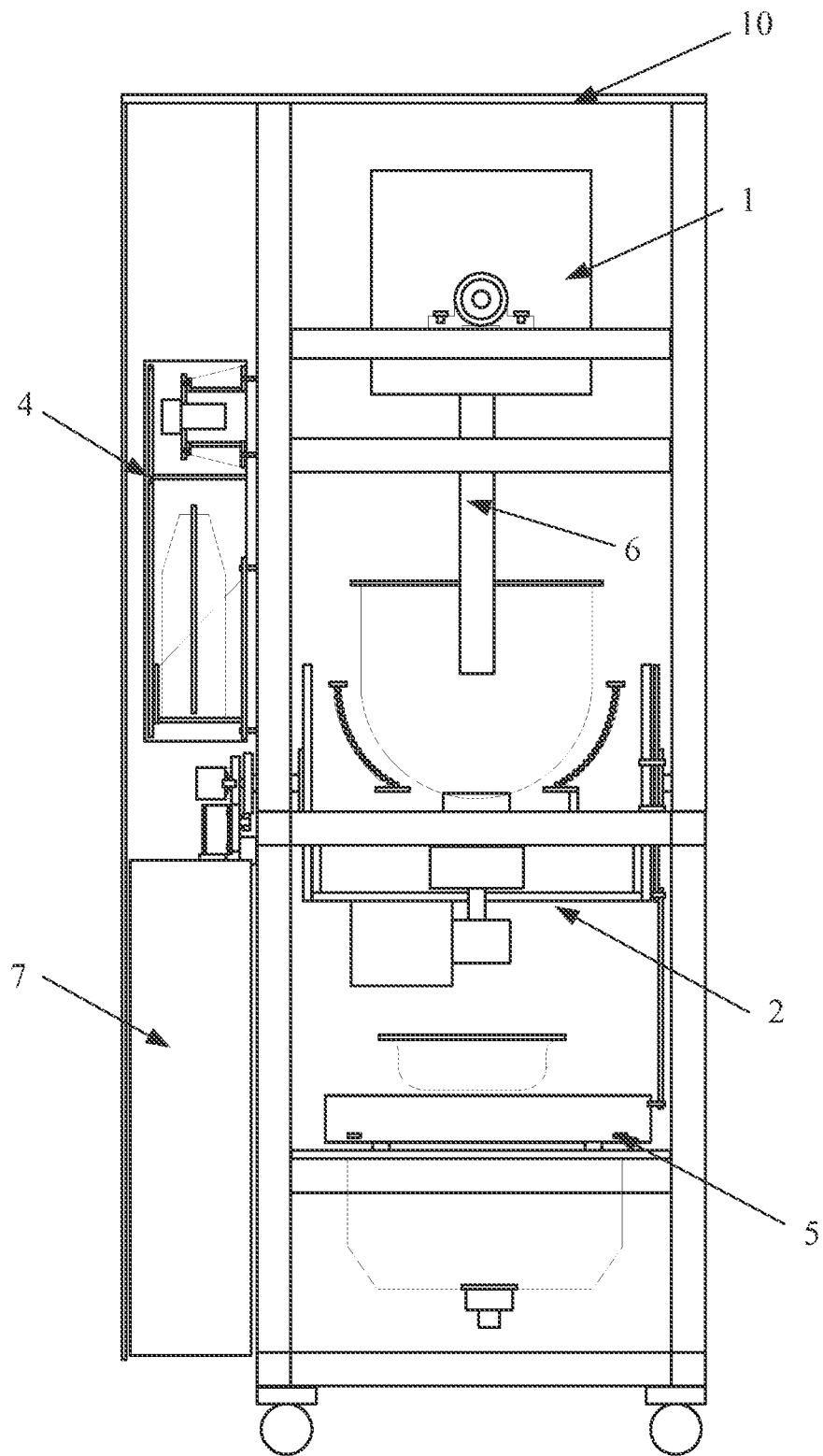
FIG. 2 is another schematic diagram showing the structure of the cooking machine illustrated in FIG. 1.

Referring to FIG. 1 and FIG. 2, an automatic ingredient feeding apparatus provided by the embodiments of the present invention is applicable in a fully automated cooking machine, wherein the fully automated cooking machine comprises, but is not limited to: a housing 10, an automatic ingredient feeding apparatus 1, a wok apparatus 2, a wok lid control apparatus 3, an automatic seasoning adding apparatus 4, an automatic dish exporting apparatus 5, an automatic wok washing apparatus 6 and a master control device 7, wherein the master control device 7 is used for running a preset recipe program and issuing commands on the basis of the preset recipe program. The automatic ingredient feeding apparatus 1, the wok apparatus 2, the wok lid control apparatus 3, the automatic seasoning adding apparatus 4, the automatic dish exporting apparatus 5 and the automatic wok washing apparatus 6 are all connected to the master control device 7, these apparatuses react accordingly to the command issued by the master control device 7, so as to realize an automatic cooking process.

In addition, the automatic ingredient feeding apparatus 1 is provided right above a wok of the wok apparatus 2, a mouth for inserting a container containing raw ingredients is opened in a side wall of the housing 10 and faces the automatic ingredient feeding apparatus 1.

Figure 3:
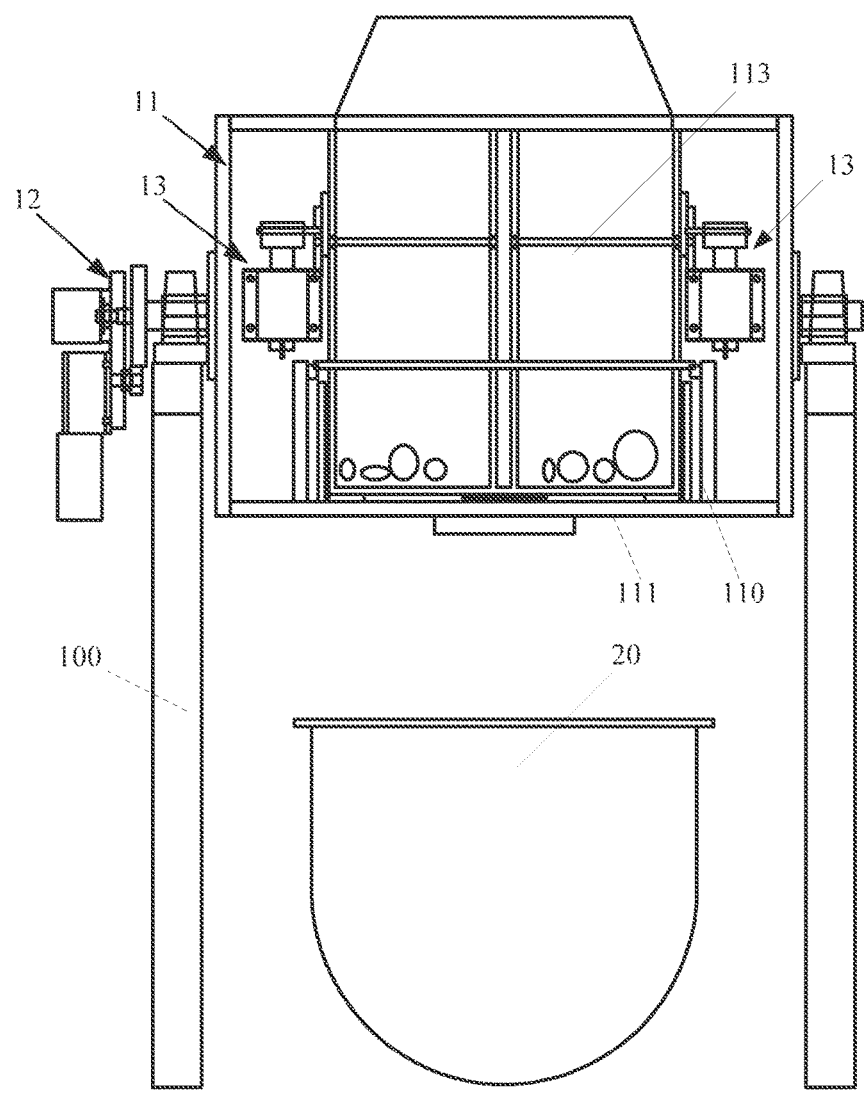
FIG. 3 is a schematic diagram showing the structure of an automatic ingredient feeding apparatus according to an embodiment of the present invention.
Figure 4:
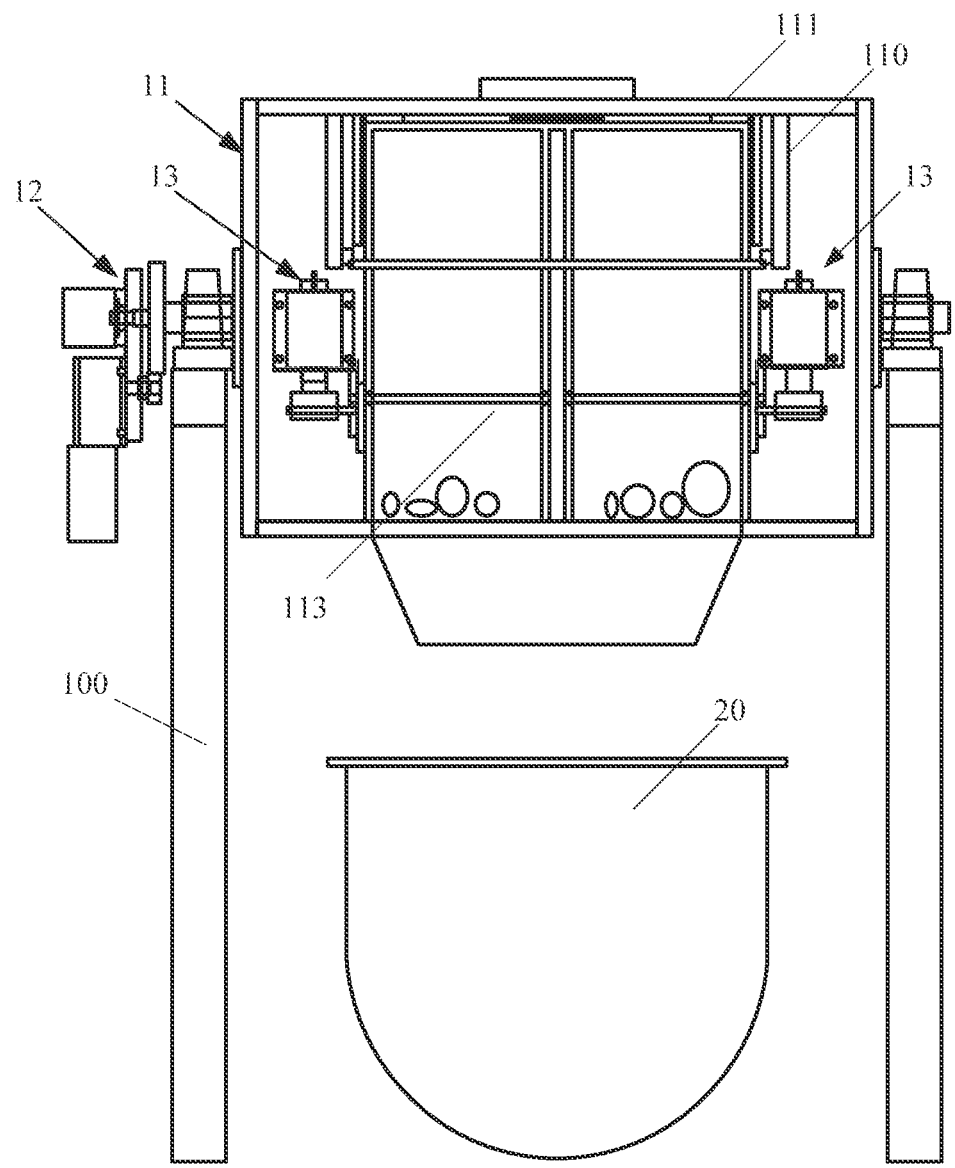
FIG. 4 is a schematic diagram showing the structure of the automatic ingredient feeding apparatus illustrated in FIG. 3, with the automatic ingredient feeding apparatus being in another state.
Figure 5:
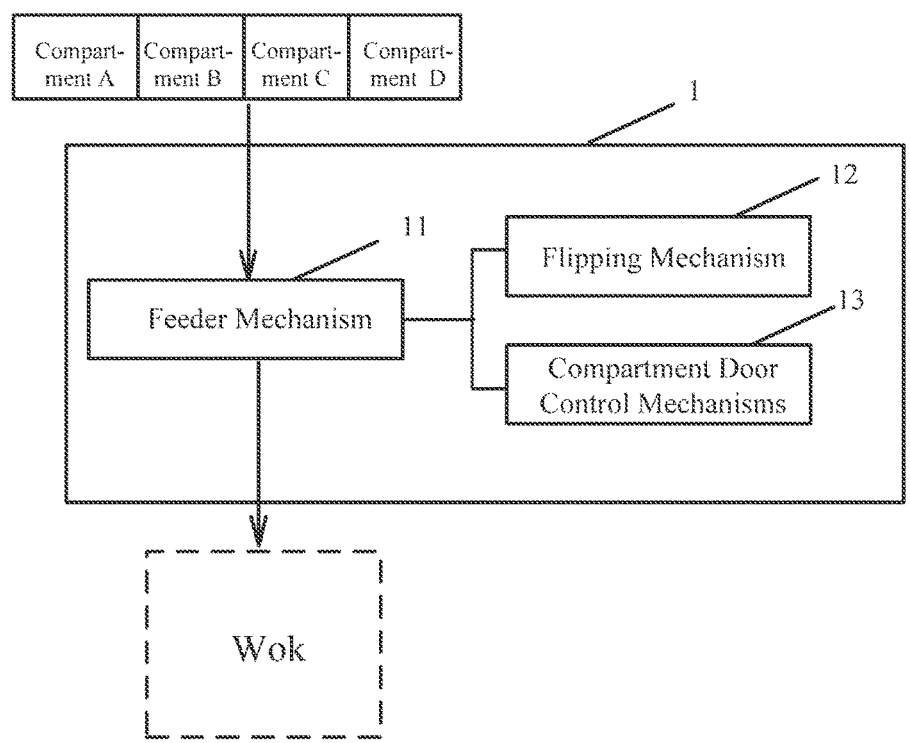
FIG. 5 is a block diagram showing the structure of the automatic ingredient feeding apparatus illustrated in FIG. 3.
Figure 6:
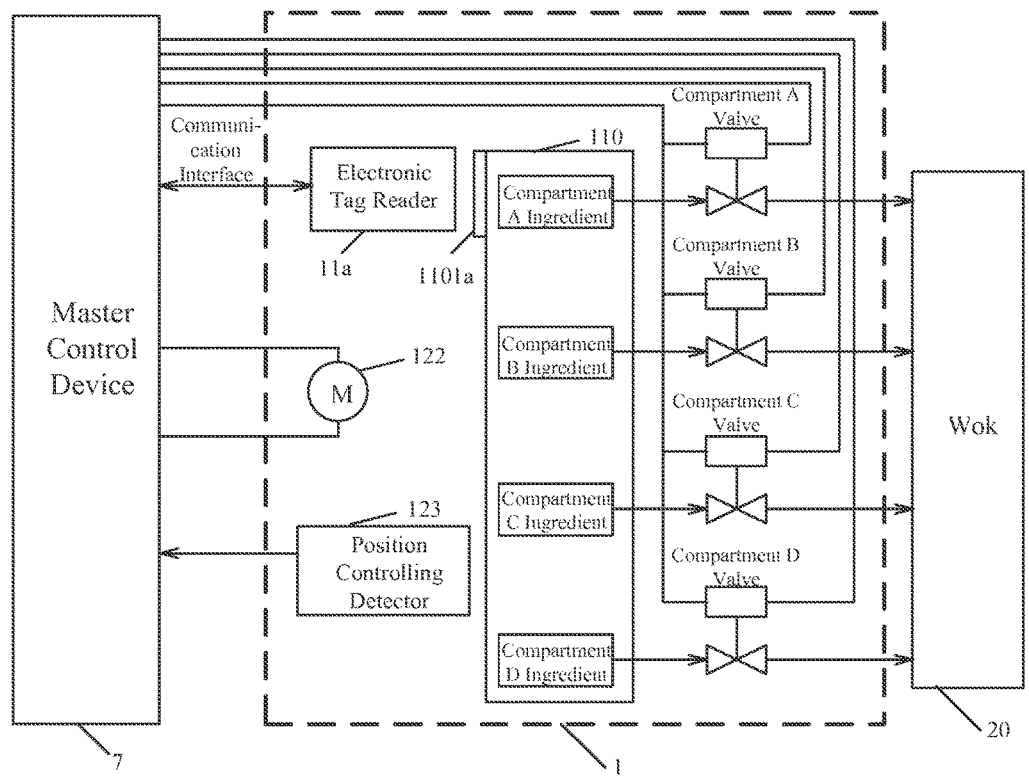
FIG. 6 is an electrical connection diagram of the automatic ingredient feeding apparatus illustrated in FIG. 3.

Referring to FIG. 3-FIG. 6, a detailed description of the structure of the automatic ingredient feeding apparatus 1 will be provided hereinafter. It's understandable that FIG. 3-FIG. 4 show the structure of a same embodiment of the automatic feeding ingredient apparatus but in different states. In this embodiment, the automatic ingredient feeding apparatus applicable in a fully automated cooking machine comprises a machine frame 100, a feeder mechanism 11, a flipping mechanism 12 for mounting the feeder mechanism 11 on the machine frame, and a plurality of compartment door control mechanisms 13. The feeder mechanism 11 is used for receiving a multi-compartment container 110 that contains the raw ingredients (see FIG. 7a-FIG. 7b). The feeder mechanism 11 comprises a shell 111, the shell 111 is provided therein with a receiving space 114 for receiving the multi-compartment container 110 (see FIG. 8a-FIG. 8c) and the shell is also provided therein with a multi-compartment ingredient-dropping chamber 113 facing the receiving space 114. Each individual compartment of the multi-compartment container 110 communicates with and leans against each individual compartment of the multi-compartment ingredient-dropping chamber 113 when the multi-compartment container 110 is received in the receiving space 114. The flipping mechanism 12 is used for mounting the feeder mechanism 11 on the machine frame 100 and for controlling the feeder mechanism 11 to implement a 180-degree flip, the 180-degree flip of the feeder mechanism 11 enables the raw ingredients in the multi-compartment container 110 to drop into the multi-compartment ingredient-dropping chamber 113. Each of the plurality of compartment door control mechanisms controls an opening/closing of a compartment door 115 of the individual compartment of the multi-compartment ingredient-dropping chamber (see FIG. 10a and FIG. 11a), therefore, the raw ingredients in the individual compartment of the multi-compartment ingredient-dropping chamber is allowed to drop into a wok 20 right below the multi-compartment ingredient-dropping chamber when the compartment door 115 is open. The flipping mechanism 12 and the plurality of compartment door control mechanisms 13 are all connected to the master control device 7 of the cooking machine to receive a command issued by the master control device on a basis of a preset recipe program and react accordingly to the command.

Figure 7A:
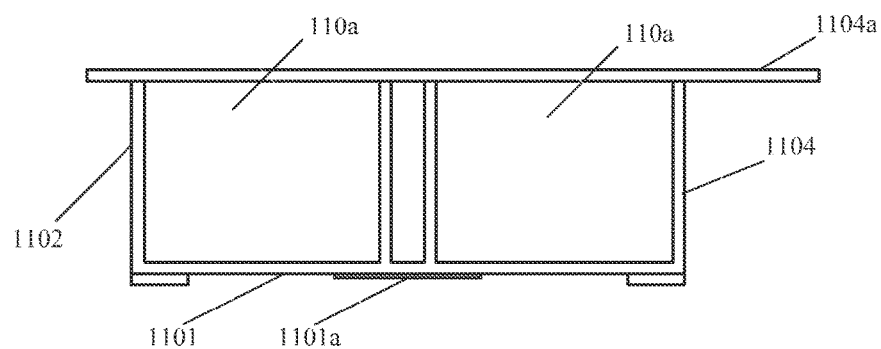
FIG. 7a-FIG. 7b are schematic diagrams showing the structure of a multi-compartment container illustrated in FIG. 3.

Referring to FIG. 7a-FIG. 7 b and FIG. 8a-FIG. 8c, a detailed description of the feeder mechanism 11 of the automatic ingredient feeding apparatus will be provided hereinafter. The shell 111 of the feeder mechanism 11 has a cubical shape, the shell 111 is provided therein with the receiving space 114 for receiving the multi-compartment container 110 and the shell 111 is also provided therein with the multi-compartment ingredient-dropping chamber 113 facing the receiving space 114. The multi-compartment ingredient-dropping chamber 113 and the multi-compartment container 110 have a same number of individual compartments. There is no divider between the multi-compartment ingredient-dropping chamber 113 and the multi-compartment container 110, so the individual compartment of the multi-compartment container 110 can communicate with and lean against a corresponding individual compartment of the multi-compartment ingredient-dropping chamber 113 when the multi-compartment container 110 is completely received in the receiving space 114. Only the opening of the compartment door can make the raw ingredients in the individual compartment of the multi-compartment ingredient-dropping chamber 113 drop out.

Figure 7B:
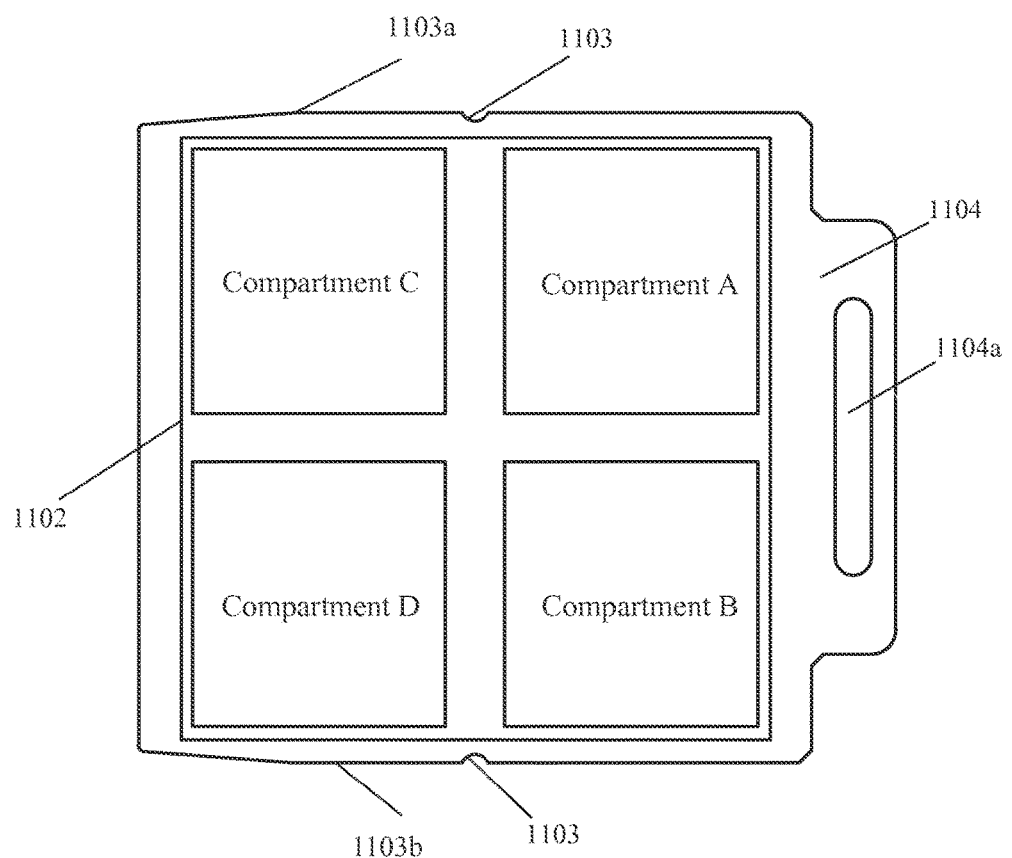
Figure 8A:
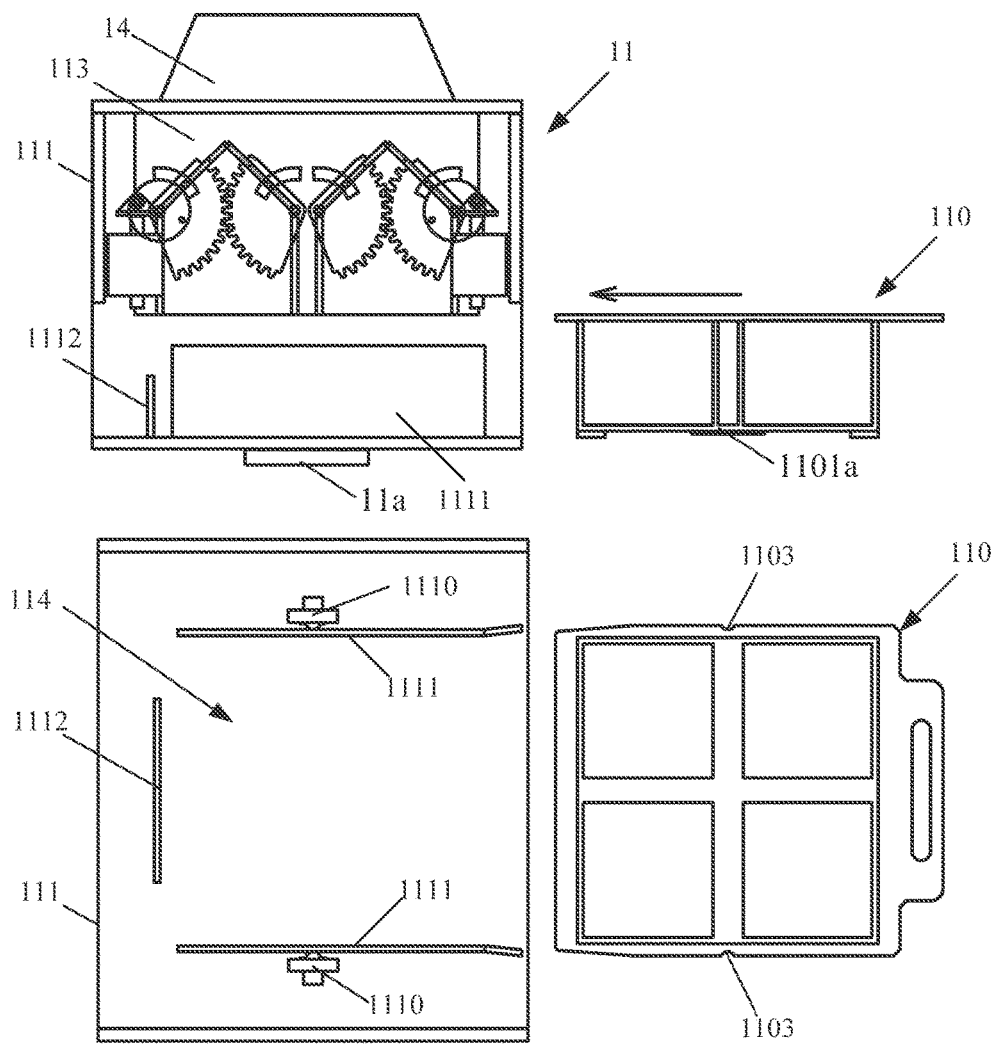
FIG. 8a-FIG. 8c are schematics diagrams showing the process of putting the multi-compartment container illustrated in FIG. 7 into a feeder mechanism.
Figure 8B:
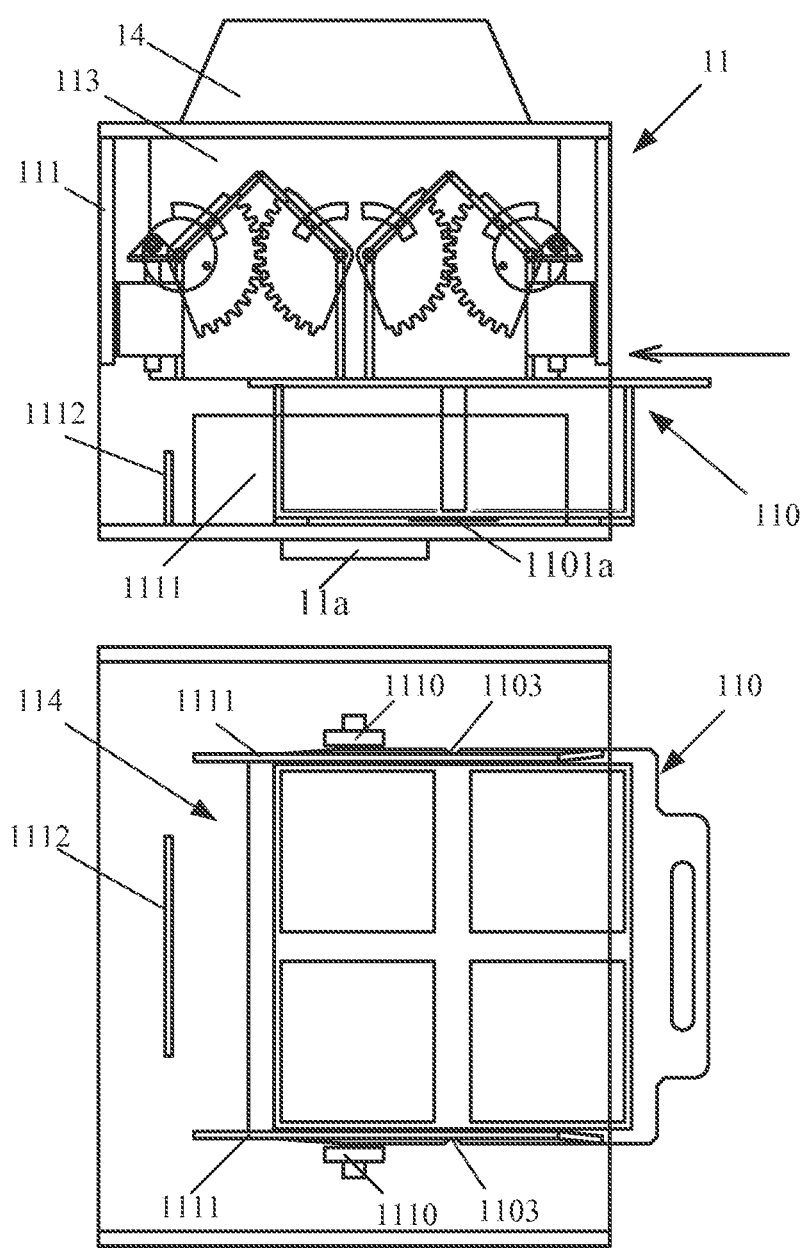
Figure 8C:
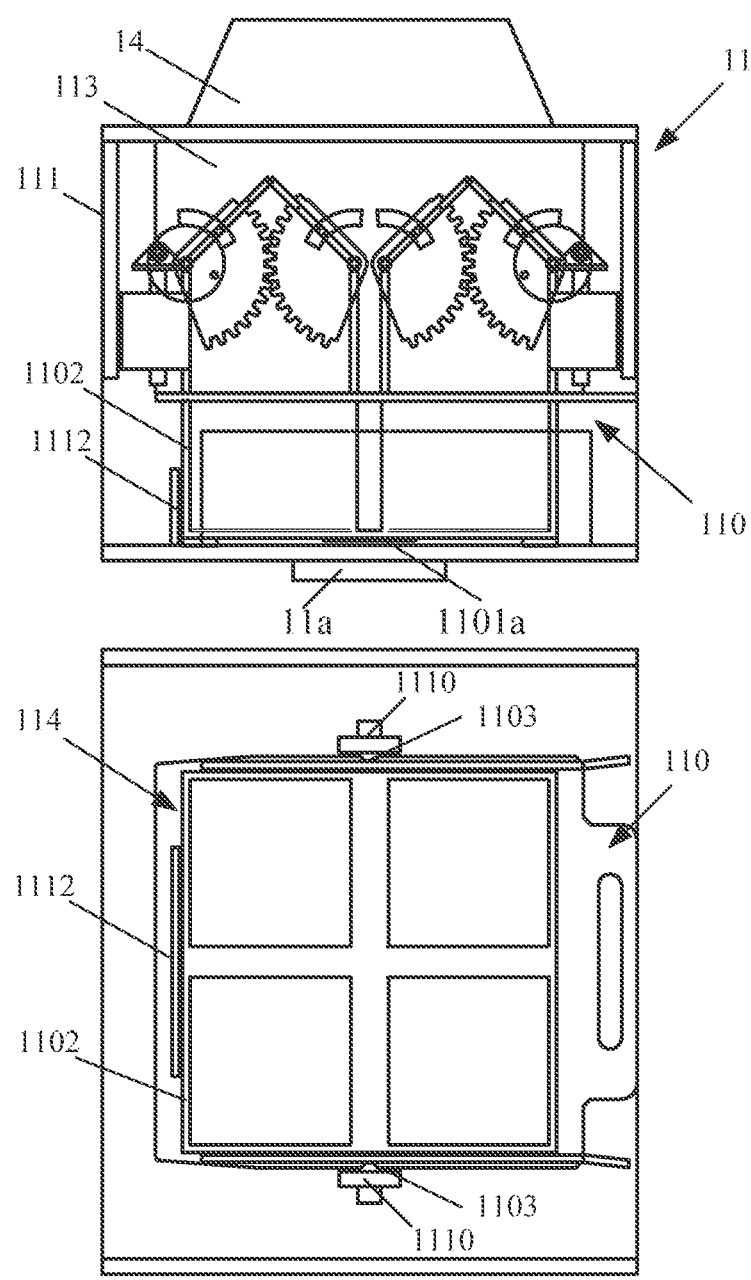

In details, referring to FIG. 7a-FIG. 7b, in this embodiment, the multi-compartment container 110 comprises four individual compartments 110a, which are compartment A, compartment B, compartment C, and compartment D. The multi-compartment container 110 comprises a bottom 1101, a front wall 1102, a left wall 1103a, a right wall 1103b and a back wall 1104. The left wall 1103a and the right wall 1103b are provided with locating recesses 1103; the back wall 1104 has a handle 1104a which facilitates an insertion of the multi-compartment container 110 into the receiving space 114 of the feeder mechanism 11.

The feeder mechanism 11 provides in the shell 111 with two side guiding plates 1111 and a baffle plate 1112, the two side guiding plates 1111 and the baffle plate 1112 form the receiving space 114. The two side guiding plates 1111 are provided with ball plungers 1110, two outer sides of the multi-compartment container 110 (i.e., the left wall 1103a and the right wall 1103b) are provided with the locating recesses 1103 for matching the ball plungers 1110 (FIG. 8a). The two side guiding plates 1111 guide the insertion of multi-compartment container 110 (FIG. 8b). When the front wall 1102 of the multi-compartment container 110 leans against the baffle plate 1112, the ball plungers 1110 get stucked right in the locating recesses 1103 so as to secure the multi-compartment container 110 in the receiving space 114 (FIG. 8c).

Preferably, an outside of the bottom 1101 of the multi-compartment container 110 is provided with an electronic tag 1101a (two-dimension codes, IC card, RFID, etc.). By reading the electronic tag 1101a (the shell 111 of the feeder mechanism 11 is provided with an electronic tag reader 11a to read the electronic tag and transmit information read from the electronic tag to the master control device), information such as a recommended recipe program or other useful data that may be needed during the process of production, storage, delivery and selling of the raw ingredients can be obtained.

In this embodiment, the multi-compartment container 110 comprises four individual compartments (compartment A, compartment B, compartment C, compartment D). The raw ingredients consisting of main ingredients and accessory ingredients are stocked in the four individual compartments respectively. Based on a preset recipe program, the automatic ingredient feeding apparatus 1 puts into the wok the raw ingredients in different individual compartments at a predetermined time in a predetermined sequence. In this embodiment, the four individual compartments allows up to 24 combinations of putting sequence.

A Chinese dish usually consists of one to three main ingredients and several accessory ingredients. For example, the dish "stir-fried Shredded Cabbage" has cabbage as a main ingredient, and chili and garlic as two accessory ingredients. The dish "Shredded Meat with Dry Tofu and Green Pepper" has shredded meat, dry tofu and green pepper as three main ingredients, and garlic and red pepper as two accessory ingredients. The raw ingredients are stocked in different individual compartments. Those raw ingredients that will be put into the wok at the same time can be stocked in a same individual compartment. In this embodiment, the raw ingredients are contained in four individual compartments, which means the raw ingredients can be put into the wok at four different moments, thus there are at most 24 combinations (ABCD, ABDC, ACBD, ACDB, ADBC, ADCB, BACD, BADC, BDAC, BDCA, BCAD, BCDA, CABD, CADB, CBAD, CBDA, CDAB, CDBA, DABC, DACB, DBAC, DBCA, DCAB, DCBA). A four-compartment container is already enough for most of the dishes. However, an over-four-compartment container, such as six-compartment container or eight-compartment container can be used to meet the requirement of some more complex dishes. It should be understood that the multi-compartment container 110 can comprise four individual compartments, six individual compartments or eight individual compartments, while the corresponding multi-compartment ingredient-dropping chamber 113 should accordingly comprise four individual compartments, six individual compartments or individual eight compartments.

In the present invention, all the raw ingredients for one dish, including the main ingredients and the accessory ingredients, are packaged and stocked in the individual compartments of the multi-compartment container. Therefore, the industrialization of the cooking machine is expectable. As a result, an industrial chain, including the production of agricultural products, pretreatment (cleaning and cutting etc.), package, delivery, distribution and consumption, can thus be established. This also leads to a new life style, since people no longer need to buy agricultural products in vegetable markets and thus less garbage will be produced. In addition, adopting a standard package helps guarantee food security.

Referring to FIG. 3, FIG. 4 and FIG. 9a-FIG. 9c, a detailed description of the flipping mechanism 12 of the automatic ingredient feeding apparatus will be provided hereinafter. The flipping mechanism 12 comprises a main shaft 121, a flipping motor 122 and a position controlling detector 1123. The shell 111 of the feeder mechanism 11 is fixedly connected to the main shaft 121 and is mounted on the machine frame 100 via the main shaft 121. One end of the main shaft 121 is connected to the flipping motor 122 so that the main shaft 121 will rotate under the control of the flipping motor 122. The flipping motor 122 is connected to the master control device? (FIG. 6) and is controlled by the master control device 7 to drive the main shaft 121 to rotate. The rotation of the main shaft 121 implements the 180-degree flip of the feeder mechanism 11. The position controlling detector 1123 is used for detecting a flipping angle of the feeder mechanism 11 and transmitting detection data to the master control device 7. In this embodiment, the position controlling detector 1123 is also used for detecting if the multi-compartment container 110 is positioned in the feeder mechanism 11.

Figure 9A:
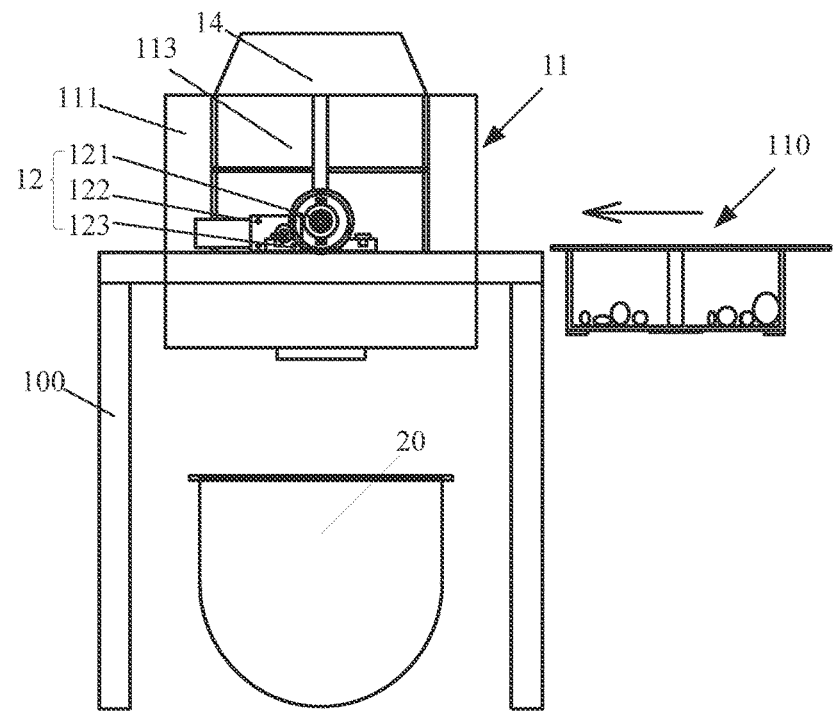
FIG. 9a-FIG. 9c are schematic diagrams showing a 180-degree flip of a feeder mechanism which is controlled by a flipping mechanism of the automatic ingredient feeding apparatus illustrated in FIG. 3.
Figure 9B:
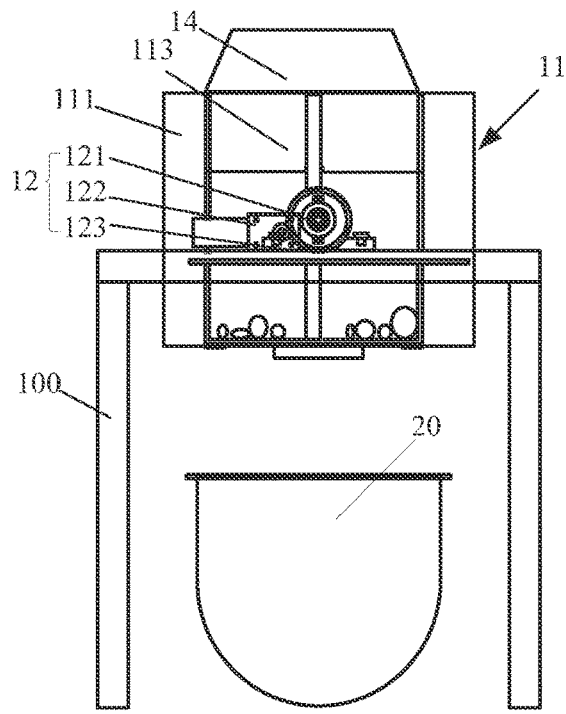
Figure 9C:
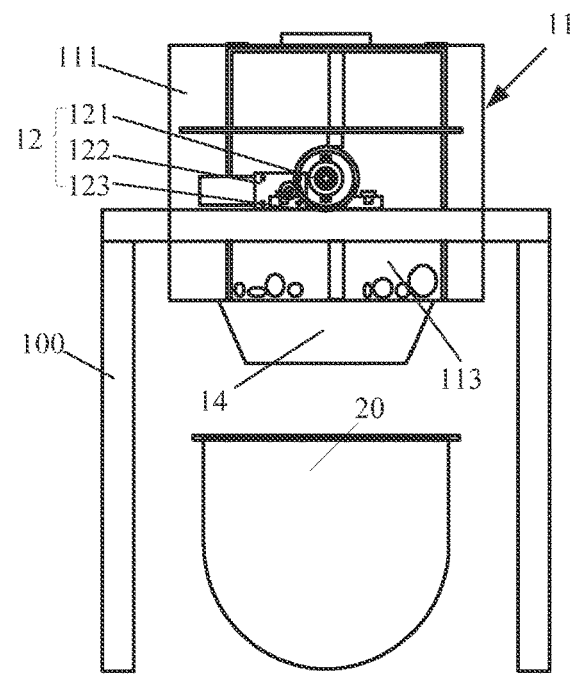

In details, referring to FIG. 9a-FIG. 9c, the multi-compartment container 110 containing the raw ingredients is firstly put into the receiving space 114 of the feeder mechanism 11. Once the multi-compartment container 110 is completely inside the receiving space 114, the position controlling detector 1123 sends a signal to the master control device 7, the master control device 7 then controls the feeder mechanism 11 to flip. During the process of flipping, the position controlling detector 1123 is used for detecting the flipping angle of the feeder mechanism 11. The raw ingredients in the multi-compartment container 110 gradually fall into the multi-compartment ingredient-dropping chamber 113 as the feeder mechanism 11 flips. Once the position controlling detector 1123 detects the feeder mechanism 11 has flipped 180 degree, it sends a signal to the master control device 7, the master control device 7 then controls the feeder mechanism 11 to stop the flipping and initiates a subsequent dropping of the raw ingredients. At this moment, all of the raw ingredients have dropped into the multi-compartment ingredient-dropping chamber 113.

Preferably, the automatic ingredient feeding apparatus of the present invention further comprises an ingredient-guiding chute 14 extending from an end of the multi-compartment ingredient-dropping chamber 113 which end is adjacent to the compartment door, the ingredient-guiding chute 14 guides the raw ingredients in the individual compartment of the multi-compartment ingredient-dropping chamber 113 to drop into the wok right below the multi-compartment ingredient-dropping chamber 113.

Referring to FIG. 10a-FIG. 10c, FIG. 11a-FIG. 11c and FIG. 12a-FIG. 12b, a detailed description of the compartment door control mechanisms of the automatic ingredient feeding apparatus will be provided hereinafter. In this embodiment, the multi-compartment container 110 and the multi-compartment ingredient-dropping chamber 113 both consist of four individual compartments, accordingly the automatic ingredient feeding apparatus is provided with four compartment door control mechanisms 13, each of the plurality of compartment door control mechanisms 13 controls an opening/closing of one compartment door. In this embodiment, the compartment door 115 of the individual compartment of the multi-compartment ingredient-dropping chamber 113 consists of two door leaves 115a, 115b that are opened or closed synchronously. Each of the plurality of compartment door control mechanisms 13 comprises two gears 131 (a left gear 131a and a right gear 131b), an elastic component 132, a magnetic valve 133, and a rod 134. The two gears 131a, 131b are engaged with each other and are fixedly connected to the two door leaves 115a, 115b respectively (to be more specific, the left gear 131a is fixedly connected to the left door leave 115a, and the right gear 131b is fixedly connected to the right door leave 115b). The left gear 131a and the right gear 131b have the same diameter and are both fan-shaped. The left gear 131a and the right gear 131b are provided with meshing teeth and they are always engaged with each other during rotation. The left door leave 115a and the right door leave 115b are connected via the elastic component 132 (in this embodiment, the elastic component 132 is a spring) and remain in a closed state under an action of the elastic component 132. One end of the rod 134 is connected to the left gear 131a/right gear 131b, the other end of the rod 134 is connected to an iron core 1331 of the magnetic valve 133. When the magnetic valve 133 is switched on, the magnetic valve 133 draws the iron core 1331 upwards to drive the rod 134 to move upwards, thus allowing the left gear 131a/right gear 131b to rotate. Since the left gear 131a is meshed with the right gear 131b, the rotation of one of the gears will force the other one to rotate. As the gears rotate, the pressure of the elastic component 132 is overcome, and the two door leaves are opened. In other words, the compartment door control mechanisms 13 convert the linear motion of the iron core into the rotational motion of the gears, which realizes the control of the two door leaves of the compartment door.

Figure 10A:
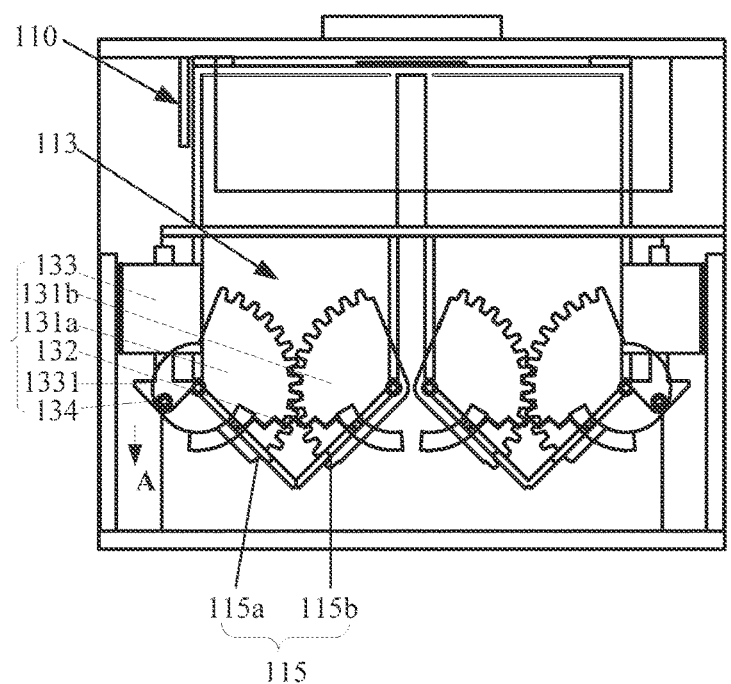
FIG. 10a-FIG. 10c are schematic diagrams showing closed compartment doors of a multi-compartment ingredient-dropping chamber of the automatic ingredient feeding apparatus illustrated in FIG. 3, with the closing of the compartment doors being controlled by a plurality of compartment door control mechanisms.
Figure 10B:
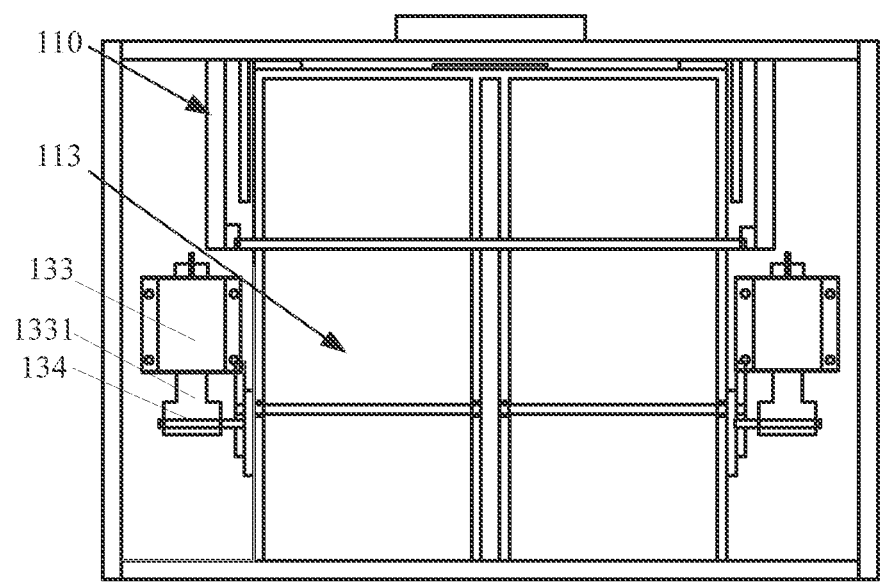
Figure 10C:
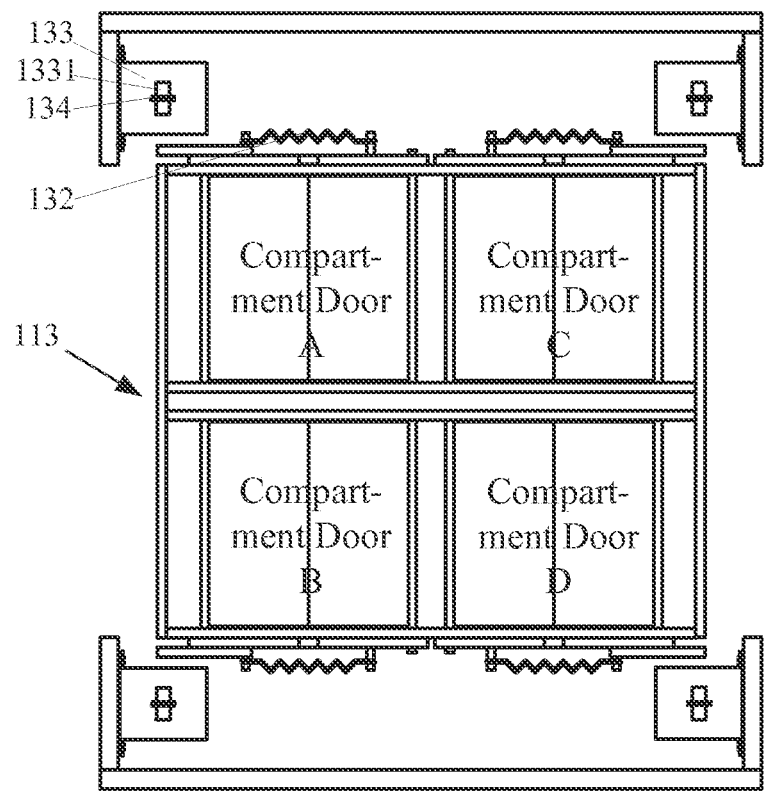

Referring to FIG. 10a-FIG. 10c, when the magnetic valve 133 is switched off, there is no magnetic field, the iron core 1331 will fall due to gravity (the direction of the fall motion is indicated by arrow A in FIG. 10a). The rod 134 is driven to move downward to rotate the left gear 131a/right gear 131b, then the left door leave 115a and the right door leave 115b will be closed and remain in a closed state due to the force of the elastic component 132. In short, while the magnetic valve 133 is powered off, the left door leave 115a and the right door leave 115b remain closed.

Figure 11A:
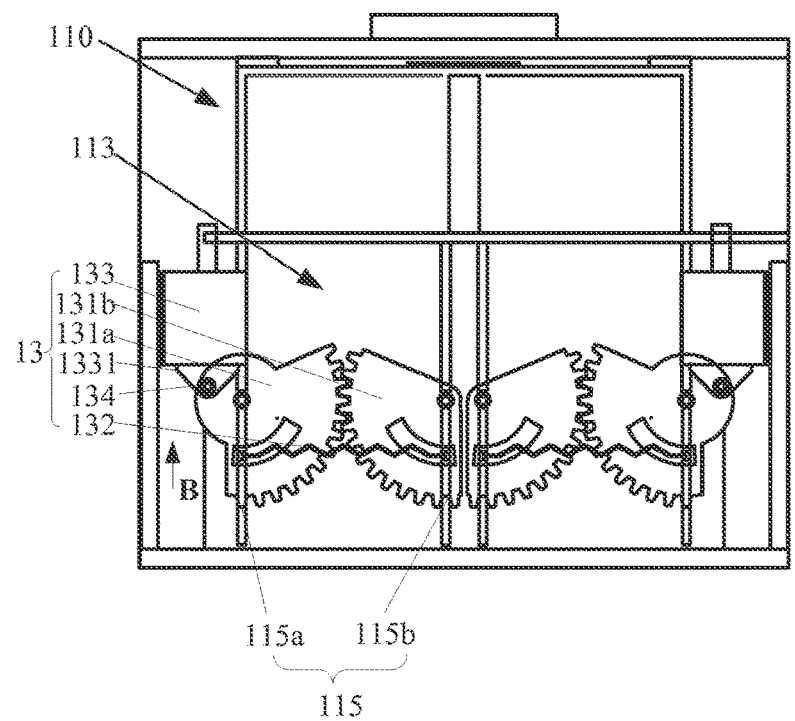
FIG. 11a-FIG. 11c are schematic diagrams showing opened compartment doors of a multi-compartment ingredient-dropping chamber of the automatic ingredient feeding apparatus illustrated in FIG. 3, with the opening of the compartment doors being controlled by a plurality of compartment door control mechanisms.
Figure 11B:
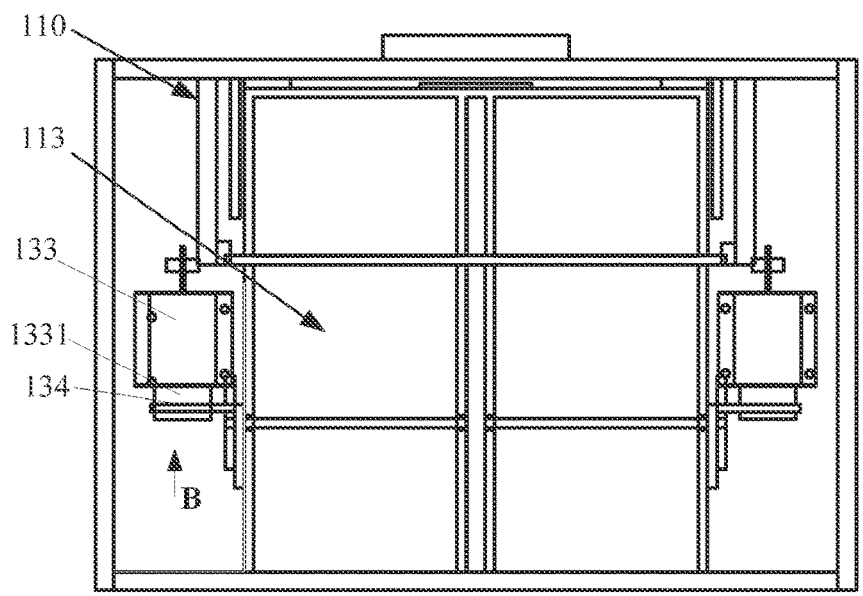
Figure 11C:
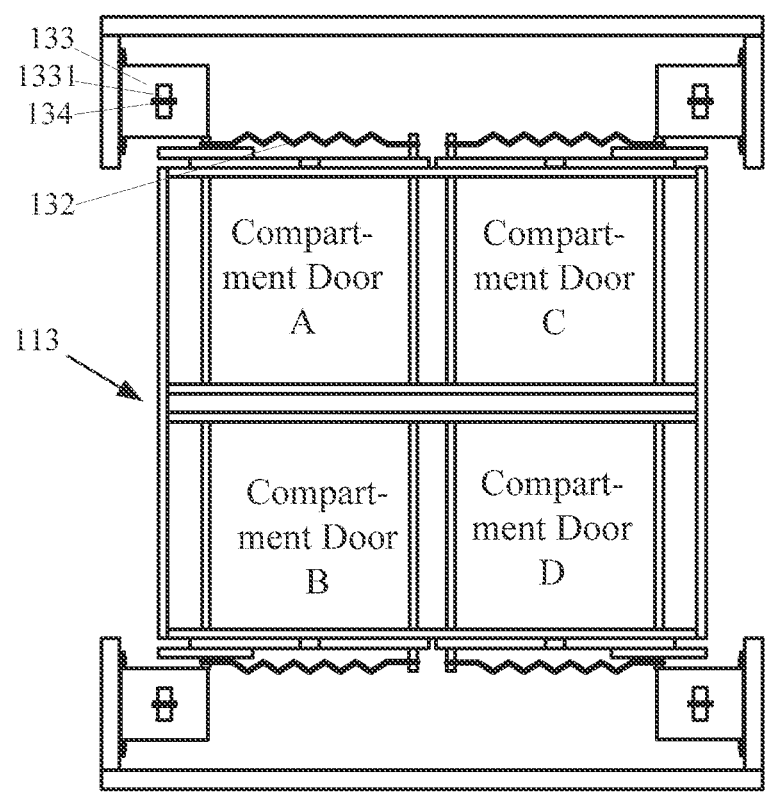
Figure 12A:
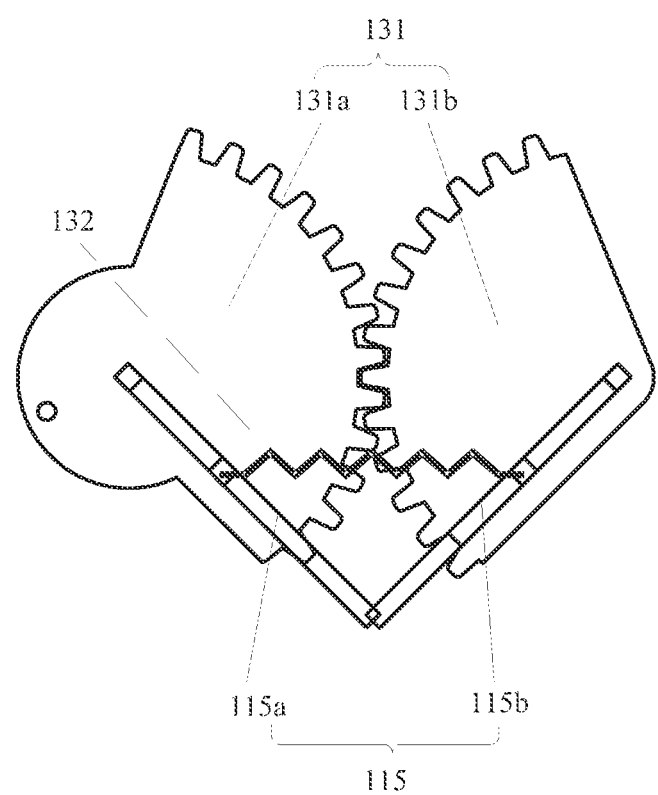
Figure 12B:
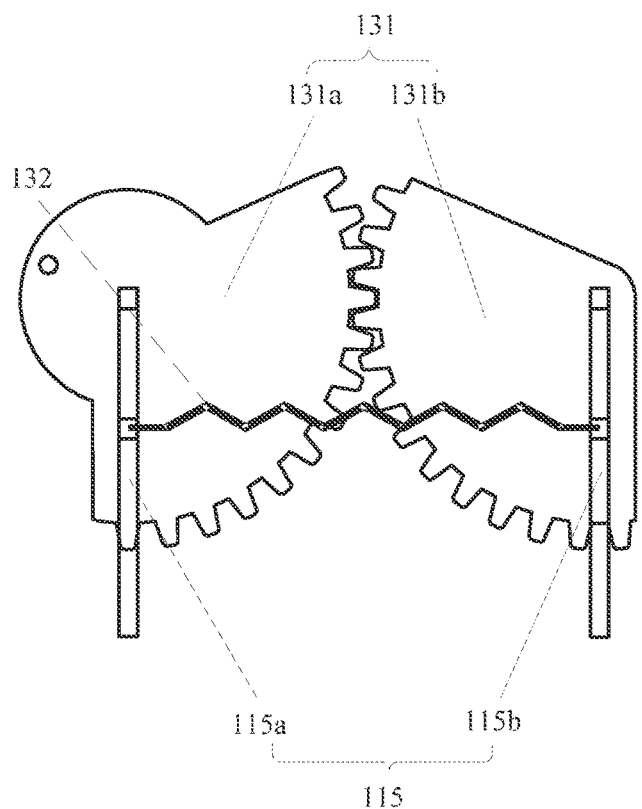

Referring to FIG. 11a-FIG. 11c, when the magnetic valve 133 is switched on, it generates a magnetic field, the magnetic valve 133 draws the iron core 1331 upwards (the direction of the upward motion is indicated by arrow B in FIG. 11a), the rod 134 is then driven to move upwards, thus allow the two gears to rotate so as to open the two door leaves by overcoming the force of the elastic component 132. When the iron core 1331 is drawn to the top, the left door leave 115a and the right door leave 115b are completely open. In short, the left door leave 115a and the right door leave 115b are opened when the magnetic valve 133 is switched on, after the door leave 115a and the right door leave 115b are completely open, the raw ingredients in the corresponding individual compartment will drop into the wok that locates right below the individual compartment.

Therefore, in order to put the raw ingredients from one individual compartment into the wok, the master control device 7 only needs to control the power of the magnetic valve of a corresponding door compartment control mechanism 13 to open a corresponding compartment door, the raw ingredients will drop into the wok 20 themselves due to gravity.

The automatic ingredient feeding apparatus of the present invention is applicable in a fully automated cooking machine. In the following embodiment, the fully automated cooking machine can be programmed with a set of commands. The set of commands is named vmmda 1.0 and is especially for Chinese cooking.

vmmda 1.0 includes 9 commands, F1: ingredient-feeding command, F2: heat-adjusting command, F3: stop-heating command, F4: rotating command, F5: time-delay command, F6: seasoning-feeding command, F7: open-lid command, F8: dish-exporting command, F9: halting command. The recipe program is formed by a sequence of commands. The fully automated cooking machine executes the commands in order.

The recipe program can be written in XML file and encoded in gb2312 for better information exchange and information sharing. So besides the fully automated cooking machine of the present invention, the recipe program can also be applied to a virtual cooking machine, cloud services, an IOT (internet of things) terminal, and so on.

The recipe program consists of two parts, a description part and a command sequence part.

The description part generally includes: a recipe program version, a recipe number, a recipe name, a creator, a creation date, an ingredient packaging version, and raw ingredients.

The command sequence part is made up of the vmmda 1.0 commands. As illustrated in Table 1, the syntax of the command sequence is as follows:

index, command; comment (can be omitted)

Each line has one command. The whole command sequence should not be over 5000 lines.

TABLE 1

| Index | Command | Comment |
|---|---|---|
| 1 | F2( ), 1; | Heat-adjusting command, parameter: 1(low)-10(high) |
| 2 | F5( ), 30; | Time-delay command, parameter: seconds |
| 3 | F6A( ), 70; | Seasoning A(oil)-feeding command, parameter: mL |

The fully automated cooking machine executes the recipe program according to the index order. However, the index can be omitted. When the index is omitted, the fully automated cooking machine executes the recipe program from top to bottom. In the following example, the command sequences in Table 2 (a), Table 2 (b) and Table 2 (c) have the same function.

TABLE 2 (a)

| 1 | F2( ), 1; | Heat-adjusting command, parameter: 1(low)-10(high) |
|---|---|---|
| 2 | F5( ), 30; | Time-delay command, parameter: duration(seconds) |
| 3 | F6A( ), 70; | Seasoning A(oil)-feeding command, parameter: volume (mL) |

TABLE 2 (b)

F2( ), 1
F5( ), 30
F6A( ), 70

TABLE 2 (c)

| 2 | F5( ), 30; |
|---|---|
| 1 | F2( ), 1; |
| 3 | F6A( ), 70; |

Any appropriate text editor can be used to write the recipe program. The recipe program can be written in XML file and encoded in gb2312. The root element is "cooking_machine_recipe", the child elements include: "ingredient_package" and "recipe_command".

The root element "cooking_machien_recipe" has the following attributes: a recipe program version, a recipe number, a recipe name, a creator and a creation date. For example:
<cooking_machine_recipe, version='vmmda 1.0' recipe_number='xjb0001' recipe_name='stir-fried Shredded Cabbage' creator='xjb' date='03/07/12'>

The child element "ingredient package" has the following attributes: a version, a compartment-A ingredient, a compartment-B ingredient, a compartment-C ingredient, a compartment-D ingredient. For example:
<ingredient_package version='vmmda 1.0' compartment_A_ingredient='shredded cabbage' compartment_B_ingredient='shredded cabbage' compartment_C_ingredient='accessory ingredient' compartment_D_ingredient=' '></ingredient_package>

The child element "recipe_command" has the following attributes: an index, a command code, and a parameter. The value of the child element "recipe command" is the comment. For example:
<recipe_command index='2' command_code='F2(3)' parameter='3'>heat-adjusting command, parameter 1 (low)-10 (high) </recipe_command>

The following example shows the format of a complete program.
<?xml version='1.0' encoding='gb2312'?>
<cooking_machine_recipe version='vmmda 1.0' recipe_number='xjb0001' recipe_name='stir-fried Shredded Cabbage' creator='xjb' date='03/07/12'?>
<ingredient_package version='vmmda 1.0' compartment_A_ingredient='shredded cabbage' compartment_B_ingredient='shredded cabbage' compartment_C_ingredient='accessory ingredient' compartment_D_ingredient=' '></ingredient_package>
<recipe_command index='1' command_code='F4(3)' parameter='3'>rotating command, parameter 1 (slow)-8 (fast) </recipe_command>
<recipe_command index='2' command_code='F2(3)' parameter='3'>heat-adjusting command, parameter 1(low)-10 (high) </recipe_command></cooking_machine_recipe>

As an example, a recipe program for cooking stir-fried Shredded Cabbage will be given as below.
<?xml version='1.0' encoding='gb2312'?>
<cooking_machine_recipe version='vmmda 1.0' recipe_number='xjb0001' recipe_name='stir-fried Shredded Cabbage' estimated_time='437' creator='xjb' date='03/07/12'>
<ingredient_package version='vmmda 1.0' compartment_A_ingredient='shredded cabbage' compartment_B_ingredient='shredded cabbage' compartment_C_ingredient='shredded cabbage' compartment_D_ingredient='accessory ingredient (garlics etc.)'></ingredient_package>
<recipe_command index='1' command_code='F4( )' parameter='3'>rotating command, parameter 1(slow)-8 (fast)</recipe_command>

```
<recipe_command index='2' command_code='F2( )'
    parameter='1'>heat-adjusting command, parameter
    1(low)-10(high)</recipe_command>
<recipe_command index='3' command_code='F6A( )'
    parameter='40'>seasoning-A(oil)-feeding command,
    parameter is volume (mL)
</recipe_command>
<recipe_command index='4' command_code='F3'
    parameter='0'>stop-heating command, no parameter</
    recipe_command>
<recipe_command index='5' command_code='F1D'
    parameter='0'>ingredient-feeding command, put ingredi-
    ent D into the wok, no parameter</recipe_command>
<recipe_command index='6' command_code='F4( )'
    parameter='3'>rotating command, parameter 1(slow)-8
    (fast)</recipe_command>
<recipe_command index='7' command_code='F2( )'
    parameter='2'>heat-adjusting command, parameter
    1(low)-10(high)</recipe_command>
<recipe_command index='8' command_code='F5( )'
    parameter='20'>time-delay command, parameter is dura-
    tion (seconds)</recipe_command>
<recipe_command index='9' command_code='F3'
    parameter='0'>stop-heating command, no parameter</
    recipe_command>
<recipe_command index='10' command_code='F1A'
    parameter='0'>ingredient-feeding command, put ingredi-
    ent A into the wok, no parameter</recipe_command>
<recipe_command index='11' command_code='F1B'
    parameter='0'>ingredient-feeding command, put ingredi-
    ent B into the wok, no parameter</recipe_command>
<recipe_command index='12' command_code='F1C'
    parameter='0'>ingredient-feeding command, put ingredi-
    ent C into the wok, no parameter</recipe_command>
<recipe_command index='13' command_code='F4( )'
    parameter='5'>rotating command, parameter 1(slow)-8
    (fast)</recipe_command>
<recipe_command index='14' command_code='F2( )'
    parameter='2'>heat-adjusting command, parameter
    1(low)-10(high)</recipe_command>
<recipe_command index='15' command_code='F5( )'
    parameter='100'>time-delay command, parameter is
    duration (seconds)</recipe_command>
<recipe_command index='16' command_code='F6C( )'
    parameter='50'>seasoning-C(soy sauce)-feeding com-
    mand, parameter is volume (mL)
</recipe_command>
<recipe_command index='17' command_code='F6D( )'
    parameter='20'>seasoning-D(vinegar)-feeding com-
    mand, parameter is volume (mL)
</recipe_command>
<recipe_command index='18' command_code='F6G( )'
    parameter='10'>seasoning-G(sesame oil)-feeding com-
    mand, parameter is volume (mL)
</recipe_command>
<recipe_command index='19' command_code='F5( )'
    parameter='100'>time-delay command, parameter is
    duration (seconds)</recipe_command>
<recipe_command index='20' command_code='F3'
    parameter='0'>stop-heating command, no parameter</
    recipe_command>
<recipe_command index='21' command_code='F5( )'
    parameter='100'>time-delay command, parameter is
    duration (seconds)</recipe_command>
<recipe_command index='22' command_code='F9'
    parameter='0'>halting command, halt the cooking
    machine, no parameter</recipe_command>
</cooking-machine-recipe>
```

The F1: ingredient-feeding command of vmmda 1.0 is used to put main ingredients and accessory ingredients into the wok. It also has a parameter indicating the compartment. The parameter can be either A, B, C, or D, so F1A, F1B, F1C and F1D are correct F1 command. When an automated cooking machine or a virtual cooking machine runs the F1 command, it puts the raw ingredients that are stocked in the specified compartment into the wok. For example, F1A means to put the raw ingredients that are stocked in compartment A into the wok. The general execution time of F1 command is 10 seconds.

Figure 13:
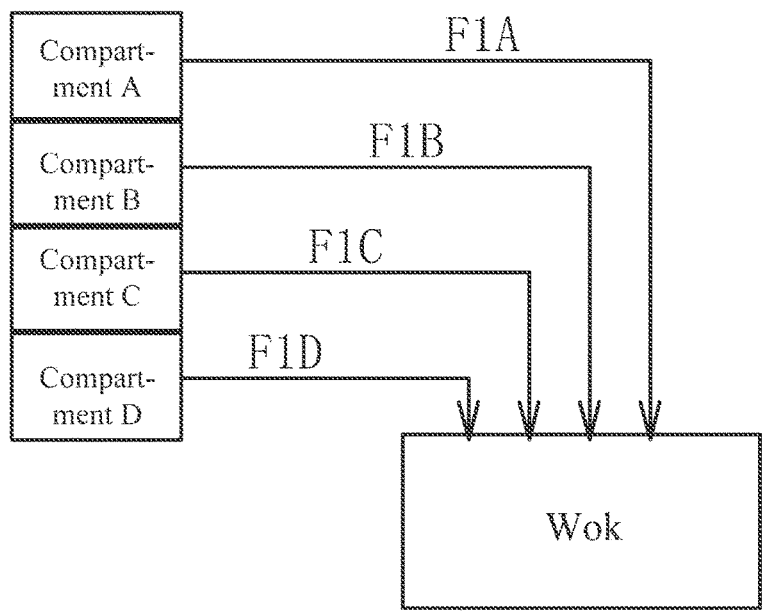
FIG. 13 is a block diagram showing commands received by the automatic ingredient feeding apparatus illustrated in FIG. 3.

In the automatic ingredient feeding apparatus provided by the embodiments of the present invention, the master control device 7 can execute the F1: seasoning-feeding command and issue corresponding commands to the flipping mechanism 12 and the multi-compartment door control mechanisms, then the flipping mechanism 12 and the multi-compartment door control mechanisms 13 act accordingly to the commands issued by the master control device. The F1 command of vmmda 1.0 is used to put the raw ingredients that are stocked in the specified compartment into the wok. Referring to FIG. 13, according to the parameter of F1 command, the raw ingredients that are stocked in the specified compartment are put into the wok. For example, if the master control device 7 executes the command F1A, it switches on the magnetic valve of the compartment A, so that the left door leave and the right door leave of compartment A are opened, and the raw ingredients that are stocked in the compartment A will drop into the wok. Similarly, if the master control device executes the command F1B, F1C or F1D, it will switch on the corresponding magnetic valve of the corresponding compartment.

The automatic ingredient feeding apparatus applicable in a fully automated cooking machine provided by the embodiments of the present invention has the following advantages:

1. High level of precision. The automatic ingredient feeding apparatus puts the raw ingredients in a predetermined sequence at a predetermined time, which realizes the precise control of the cooking process.

2. High level of automation. No manual handling operation is involved in the cooking process, except that the raw ingredients should be placed into the receiving space of the cooking machine by an operator.

3. Diversification of feeding operation. The raw ingredients are stocked in the individual compartments (e,g, compartment A, compartment B, compartment C, compartment D, . . . ), one or more raw ingredients in a certain individual compartment is controlled to be put into the wok according to a predetermined sequence at a predetermined time. Therefore, a variety of dishes can be prepared by varying the raw ingredients, the sequence or the time for putting the raw ingredients.

4. High level of generality. The automatic ingredient feeding apparatus of the present application facilitates a standardization of the package of the raw ingredients. As a result, the process of production, storage, delivery and selling of the raw ingredients can all be standardized. The electronic tag (two-dimension codes, IC card, RFID, etc.) of the multi-compartment container provides an easy access to useful information, such as recommended recipe programs or details about the production, storage, delivery and selling of the raw ingredients.

What is claimed is:

1. An automatic ingredient feeding apparatus applicable in a fully automated cooking machine, comprising:

A machine frame;

a feeder mechanism mounted on the machine frame for receiving a multi-compartment container containing raw ingredients, the feeder mechanism comprising a shell, the shell enclosing a cavity, low part of the cavity being provided therein with a receiving space for receiving the multi-compartment container and upper part of the cavity being provided therein with a multi-compartment ingredient-dropping chamber facing the receiving space, each individual compartment of the multi-compartment container is closely fitted with each individual compartment of the multi-compartment ingredient-dropping chamber with their openings being faced to each other when the multi-compartment container is received in the receiving space;

a flipping mechanism comprising a main shaft for mounting the feeder mechanism on the machine frame and comprising a flipping motor for controlling the feeder mechanism to implement a 180-degree flip, the 180-degree flip of the feeder mechanism enabling the shell to turn upside down, the receiving space to turn to upper part of the cavity and the multi-compartment ingredient-dropping chamber to turn to lower part of the cavity, the raw ingredients in the multi-compartment container dropping into the multi-compartment ingredient-dropping chamber during the 180-degree flip; and a plurality of compartment door control mechanisms arranged in the shell, each of the plurality of compartment door control mechanisms controlling an opening/closing of a compartment door of the individual compartment of the multi-compartment ingredient-dropping chamber to allow the raw ingredients in the individual compartment of the multi-compartment ingredient-dropping chamber to drop into a wok right below the multi-compartment ingredient-dropping chamber when the compartment door is open, the flipping mechanism and the plurality of compartment door control mechanisms being all communicatively connected to a master controller of the cooking machine to receive a command issued by the master controller on a basis of a preset recipe program and react accordingly to the command.

2. The automatic ingredient feeding apparatus as claimed in claim 1, wherein the flipping mechanism comprises a main shaft and a flipping motor, the shell of the feeder mechanism is fixedly connected to the main shaft and is mounted on the machine frame via the main shaft; the flipping motor is connected to the master controller and is controlled by the master controller to drive the main shaft to rotate, the rotation of the main shaft implements the 180-degree flip of the feeder mechanism.

3. The automatic ingredient feeding apparatus as claimed in claim 2, wherein the flipping mechanism further comprises a position controlling detector for detecting a flipping angle of the feeder mechanism and transmitting detection data to the master controller.

4. The automatic ingredient feeding apparatus as claimed in claim 1, wherein the compartment door of the individual compartment of the multi-compartment ingredient-dropping chamber consists of two door leaves that are opened or closed synchronously.

5. The automatic ingredient feeding apparatus as claimed in claim 4, wherein each of the plurality of compartment door control mechanisms comprises two gears, an elastic component, a magnetic valve and a rod, the two gears are engaged with each other and are fixedly connected to the two door leaves respectively, the two door leaves are connected via the elastic component and are in a closed state by the elastic component, one end of the rod is connected to one of the gears, the other end of the rod is connected to an iron core of the magnetic valve; when the magnetic valve is switched on, the magnetic valve draws the iron core upwards to drive the rod to move upwards, thus allowing the two gears to rotate, so as to open the two door leaves by overcoming the pressure of the elastic component.

6. The automatic ingredient feeding apparatus as claimed in claim 1, wherein the feeder mechanism provides in the shell with two side guiding plates and a baffle plate, the two side guiding plates and the baffle plate form the receiving space.

7. The automatic ingredient feeding apparatus as claimed in claim 6, wherein the two side guiding plates are provided with ball plungers, two outer sides of the multi-compartment container are provided with locating recesses for matching the ball plungers, when a front wall of the multi-compartment container leans against the baffle plate, the ball plungers get stuck right in the locating recesses so as to secure the multi-compartment container in the receiving space.

8. The automatic ingredient feeding apparatus as claimed in claim 1, wherein the multi-compartment container comprises four individual compartments, six individual compartments or eight individual compartments, the multi-compartment ingredient-dropping chamber accordingly comprises four individual compartments, six individual compartments or eight individual compartments.

9. The automatic ingredient feeding apparatus as claimed in claim 1, wherein the multi-compartment container is provided with an electronic tag, the shell of the feeder mechanism is provided with an electronic tag reader to read the electronic tag and transmit information read from the electronic tag to the master controller.

10. The automatic ingredient feeding apparatus as claim in claim 1, wherein the automatic ingredient feeding apparatus further comprises an ingredient-guiding chute extending from an end of the multi-compartment ingredient-dropping chamber which end is adjacent to the compartment door, the ingredient-guiding chute guides the raw ingredients in the individual compartment of the multi-compartment ingredient-dropping chamber to drop into the wok right below the multi-compartment ingredient-dropping chamber.

* * * * *